(12) United States Patent
Billman et al.

(10) Patent No.: US 11,361,317 B2
(45) Date of Patent: Jun. 14, 2022

(54) VALIDATING A CUSTOMER IN AN ELECTRONIC TRANSACTION

(71) Applicant: Comenity LLC, Columbus, OH (US)

(72) Inventors: Christian Billman, Gahanna, OH (US); Uchenna Chilaka, Blacklick, OH (US); Christina Mosholder, Powell, OH (US); Randall Piatt, Blacklick, OH (US); Timothy D. Pontious, Gahanna, OH (US); Tom Pugh, Powell, OH (US); Celeste Rechner, Upper Arlington, OH (US)

(73) Assignee: Comenity LLC, Columbus, OH (US)

(*) Notice: Subject to any disclaimer, the term of this patent is extended or adjusted under 35 U.S.C. 154(b) by 102 days.

(21) Appl. No.: 16/712,892

(22) Filed: Dec. 12, 2019

(65) Prior Publication Data

US 2020/0380509 A1 Dec. 3, 2020

Related U.S. Application Data

(60) Provisional application No. 62/854,258, filed on May 29, 2019.

(51) Int. Cl.
*G06Q 20/40* (2012.01)
*G06Q 20/20* (2012.01)
*G06Q 20/36* (2012.01)
*G06Q 20/12* (2012.01)
*G06Q 20/32* (2012.01)
*G06Q 20/38* (2012.01)

(52) U.S. Cl.
CPC ............ *G06Q 20/40* (2013.01); *G06Q 20/12* (2013.01); *G06Q 20/20* (2013.01); *G06Q 20/32* (2013.01); *G06Q 20/3674* (2013.01); *G06Q 20/382* (2013.01); *G06Q 20/385* (2013.01)

(58) Field of Classification Search
CPC .... G06Q 20/40; G06Q 20/20; G06Q 20/3674; G06Q 20/12; G06Q 20/32; G06Q 20/382; G06Q 20/385
USPC .......................................................... 705/44
See application file for complete search history.

(56) References Cited

U.S. PATENT DOCUMENTS

| | | | |
|---|---|---|---|
| 2015/0081567 A1* | 3/2015 | Boyle | G06Q 20/02 705/71 |
| 2016/0232515 A1* | 8/2016 | Jhas | G06Q 30/06 |
| 2017/0011395 A1* | 1/2017 | Pillai | G06Q 20/3278 |
| 2017/0103388 A1* | 4/2017 | Pillai | H04W 4/02 |

* cited by examiner

*Primary Examiner* — Lindsay M Maguire

(57) ABSTRACT

In a method of validating a customer in an electronic transaction, an electronic interface of a vendor requests a first set of personal information to validate a customer. The first set of personal information is requested as a portion of a transaction between the electronic interface and a customer device used by the customer. Responsive to the customer's authorization, the electronic interface receives from the customer device an encrypted token which includes a second set of personal information which identifies the customer and encompasses at least a portion of the first set of personal information. The encrypted token is provided to the customer device from a third-party via an application on the customer device and is configured with the second set of personal information prior to the transaction. The electronic interface completes the transaction using the second set of personal information decrypted from the encrypted token to validate the customer.

20 Claims, 8 Drawing Sheets

600

```
REQUEST, BY AN ELECTRONIC INTERFACE OF A VENDOR, A FIRST SET OF
PERSONAL INFORMATION TO VALIDATE A CUSTOMER, WHEREIN THE FIRST
  SET OF PERSONAL INFORMATION IS REQUESTED AS A PORTION OF A
 TRANSACTION BETWEEN THE ELECTRONIC INTERFACE AND A CUSTOMER
                    DEVICE USED BY THE CUSTOMER
                                610
```

↓

```
      RESPONSIVE TO AUTHORIZATION BY THE CUSTOMER, RECEIVE AT
THE ELECTRONIC INTERFACE FROM THE CUSTOMER DEVICE AN ENCRYPTED
    TOKEN WHICH INCLUDES A SECOND SET OF PERSONAL INFORMATION
      WHICH IDENTIFIES THE CUSTOMER AND ENCOMPASSES AT LEAST A
    PORTION OF THE FIRST SET OF PERSONAL INFORMATION, WHEREIN THE
 ENCRYPTED TOKEN IS PROVIDED TO THE CUSTOMER DEVICE FROM A THIRD-
       PARTY VIA AN APPLICATION ON THE CUSTOMER DEVICE AND IS
 CONFIGURED WITH THE SECOND SET OF PERSONAL INFORMATION PRIOR TO
                          THE TRANSACTION
                                620
```

↓

```
COMPLETE, BY THE ELECTRONIC INTERFACE, THE TRANSACTION USING THE
    SECOND SET OF PERSONAL INFORMATION DECRYPTED FROM THE
        ENCRYPTED TOKEN TO VALIDATE THE CUSTOMER
                            630
```

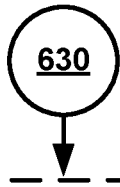

┌─────────────────────────────────────────────────────────────────┐
│ RESPONSIVE TO AUTHORIZATION FROM THE CUSTOMER, RECEIVE          │
│ ADDITIONAL INFORMATION FROM THE THIRD-PARTY TO THE ELECTRONIC   │
│ INTERFACE TO SUPPLEMENT THE SECOND SET OF PERSONAL INFORMATION  │
│ IN THE ENCRYPTED TOKEN, WHEREIN THE ADDITIONAL INFORMATION      │
│ INCLUDES ONE OF: A CREDIT SCORE AND A CREDIT REPORT             │
│ 640                                                             │
└─────────────────────────────────────────────────────────────────┘

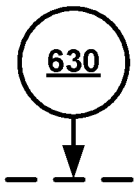

┌─────────────────────────────────────────────────────────────────┐
│ DELETE THE SECOND SET OF PERSONAL INFORMATION FROM              │
│ STORAGE BY THE VENDOR IN RESPONSE TO RECEIVING A REVOCATION     │
│ REQUEST FROM ONE OF THE APPLICATION AND A COMPUTER OF THE THIRD-│
│ PARTY                                                           │
│ 650                                                             │
└─────────────────────────────────────────────────────────────────┘

FIG. 6C

VALIDATING A CUSTOMER IN AN ELECTRONIC TRANSACTION

CROSS-REFERENCE TO RELATED APPLICATIONS (PROVISIONAL)

This application claims priority to and benefit of U.S. Provisional Patent Application No. 62/854,258 filed on May 29, 2019 entitled "VALIDATING A CUSTOMER IN AN ELECTRONIC TRANSACTION" by Billman et al., and assigned to the assignee of the present application, the disclosure of which is hereby incorporated by reference in its entirety.

BACKGROUND

An electronic transaction such as buying a product to be shipped or setting up a credit account, bank account, customer loyalty/award account, insurance account, health account or the like typically requires that a customer provide personal information to the vendor with whom the customer is transacting. Conventionally, this is accomplished by a customer typing in the requested information in fields of an electronic interface provided by the vendor. In some instances, if a customer has provided similar information in the past, an internet browser (when so enabled) may save the information and automatically populate it in the fields if the electronic interface is presented within a browser previously used by the customer to enter such personal information.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIGS. 6A-6C depict a flow diagram of a method of validating a customer in an electronic transaction, in accordance with various embodiments.

DESCRIPTION OF EMBODIMENTS

Figure 1:
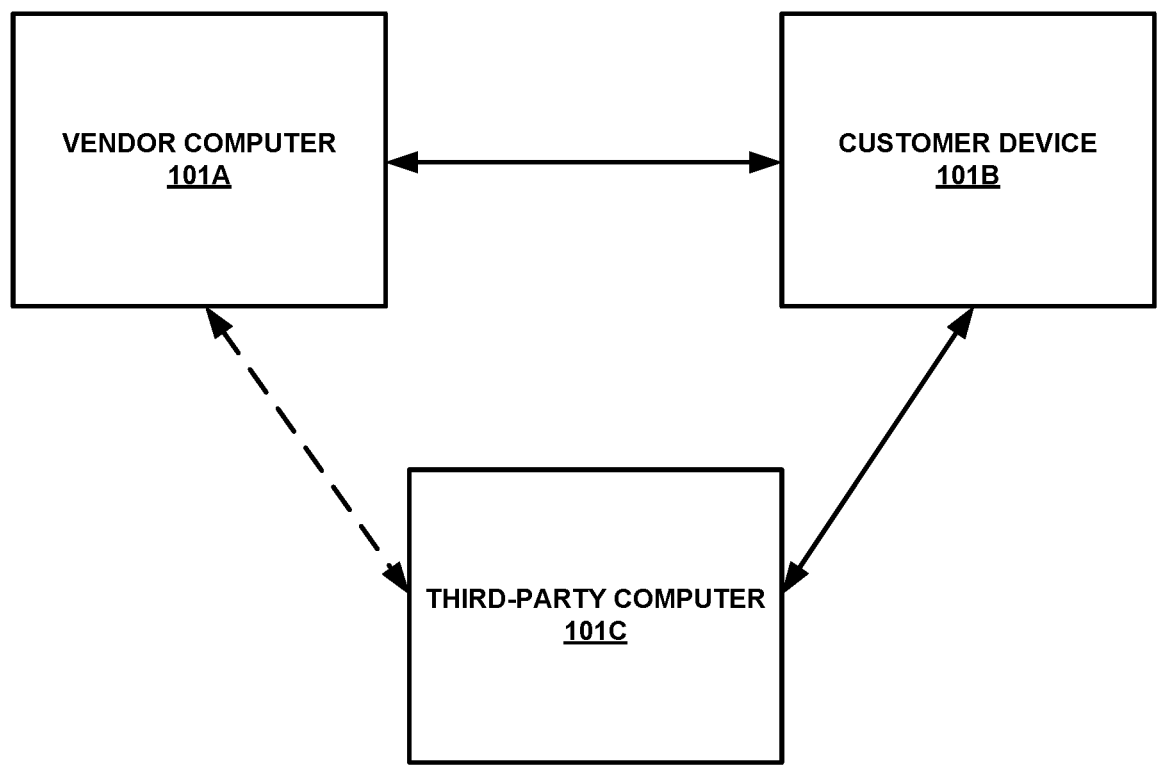
FIG. 1 illustrates a block diagram of a system for validating a customer in an electronic transaction, in accordance with various embodiments.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "requesting," "receiving," "completing," "deleting," "presenting," "decrypting," "filling," "sending," or the like, often refer to the actions and processes of an electronic computing device/system, such as a personal computer, tablet computer, mobile cellular telephone, a smart watch, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

It should be appreciated that, to any extent it is described herein, the obtaining or accessing of user/account holding customer information conforms to applicable privacy laws (e.g., federal privacy laws, state privacy laws, etc.) and applicable fair credit reporting act laws. In one embodiment, prior to accessing such information, the user/account holding customer affirmatively "opts-in" to the services described herein. For example, during the use of an issuer's/account purveyor's mobile application, the user of the mobile application is prompted with a choice to affirmatively "opt-in" to various services. As a result, any information is obtained with prior permission.

Moreover, the embodiments described herein do not recite a mathematical algorithm; nor do they recite a fundamental economic or longstanding commercial practice. Instead, they address a number of business challenges including providing a customer's personal information to vendor quickly, securely, under the control of the customer, and without repeated entry of this information by the customer. Thus, the embodiments do not merely recite the performance of some business practice known from the pre-Internet or pre-computer world along with the requirement to perform it on the Internet and/or with a computer. Instead, the embodiments are necessarily rooted in computer technology in order to overcome problems specifically arising in the realm of acquiring and/or protecting personal information of a customer used in an electronic transaction (e.g., buying something online, filling a form, filling out an application, or the like) by a vendor (e.g., a bank, merchant, hospital, insurer, company, or the like). For example, the personal information may be requested in regard to a customer account (e.g., credit account, bank account, medical account, insurance account, customer loyalty/award account, or the like) or setup thereof and/or to validate a customer in association with an electronic transaction. For example, as will be discussed, the scale of what is described could not be accomplished absent use of computers.

Overview of Discussion

As more and more transactions between customers and vendors take place at least partially electronically, customers are constantly requested to provide personal information. These transactions may vary from e-commerce transactions which take place using the internet to transactions which take place at least partially electronically at a point of sale terminal where part of the transaction is conducted using a mobile electronic device (e.g., a cellular telephone, smart watch, or the like of the customer). The personal information is often used to validate the customer in some manner to assist with the transaction. For example, a vendor may need a customer's address and/or phone number to ship a product. In another instance, a vendor may use the customer's personal information to enroll the customer in a loyalty program. In another instance, a customer may provide personal information to validate a special offer, such as a discount, which was made available to the customer through direct advertising to prior customers. In other embodiments, the customer may wish to apply for a credit account or other type of account/service provided by a vendor, and the personal information is used to fill out a form or application which is used to process the customer's request. As mentioned above, entering this information is often done by hand either by a customer or a sometimes by a vendor representative (e.g., by a sales associate at a point of sale terminal). Aside from being tedious and often repetitious, such hand keying is prone to errors and often exposes the customer's personal information to risk of theft. Even in an instance when such information is filled automatically by an internet browser, it may not be stored or transmitted in a secure fashion or any person using the browser after the customer has used it may be able to populate another form with the customer's personal information. Herein, techniques are described for creating an encrypted token which includes personal information of a customer, providing it to a vendor in response to a request for personal information from a customer, and decrypting it at the vendor end of a transaction to validate the customer and complete the transaction. In this manner, a customer's personal information is stored in an encrypted fashion, its transmission is controlled by the customer, tedium of entry of information is reduced as information may only be entered once and revised as needed, and the chance for introducing errors by re-keying the information is eliminated.

Discussion begins with a description of a system for supplying customer information for an electronic transaction. The system includes an application which disposed on a customer device, a vendor's electronic interface, and a third-party computer. Examples of operation of the various components of the system are provided and discussed. The operation of the system and its components is further discussed in connection with discussion of a method of validating a customer in an electronic transaction. Finally, a block diagram of an example computer system is described, with which or upon which various embodiments may be implemented. It should be appreciated that some embodiments may utilize more than one computer system and/or a distributed computer system in which one or more components of the computer system are dispersed.

Operation

Referring now to the figures, FIG. 1 illustrates a block diagram of a system 100 for validating a customer in an electronic transaction, in accordance with various embodiments. System 100 includes a vendor computer 101A, a customer device 101B, and a third-party computer 101C. The components of vendor computer 101A, customer device 101B, and third-party computer 101C are described in greater detail in conjunction with discussion of FIGS. 2-6C and with discussion of computer system 101 of FIG. 7.

FIG. 1 illustrates an operational environment of system 100 in which vendor computer 101A and customer device 101B communicate with one another, customer device 101B and third-party computer 101C communicate with one another, and in some embodiments third party computer 101C and vendor computer 101A communicate with one another.

Vendor computer 101A may be a single computing device (e.g., a point-of-sale terminal), a collection of interoperating vendor-side computing devices (e.g., a web server and associated computers), or a network of computers which may be distributed. In general, vendor computer 101A includes processing, memory, storage, and an electronic interface and may include one or more other elements described in conjunction with computer system 101 of FIG. 7. The electronic interface 210 is discussed further in conjunction with FIG. 2 and is a means by which a first set of customer information may be requested of a customer as a portion of a transaction between the electronic interface and a customer device 101B used by the customer. The electronic transaction may be a redemption of an offer (e.g., a coupon) or award (e.g., loyalty points used in-kind in place of currency), application for a branded credit card, sign-up for a loyalty program, application for a loan, application for insurance (e.g., health, auto, home, etc.), sign-up for access to a website, or another transaction which requires a set of personal information to complete the transaction. The first set of personal information is a collection of personally identifiable information (PII) which is beyond just the name of the customer.

Customer device 101B belongs to or is being used by a customer. For example, customer device 101B may be a customer's mobile/cellular telephone (e.g., a smartphone), smart watch, tablet computer, personal computer, or other computing device. Customer device 101B is capable of electronically communicating with and interacting with vendor computer 101A and with third-party computer 101C. In general, customer device 101B includes processing, memory, storage, and an application (e.g., application 310) which allows a customer to store PII of the customer in an encrypted token. Customer device 101B may include one or more other elements described in conjunction with computer system 101 of FIG. 7. The application included on customer device 110B (e.g., application 310) also allows the customer to elect to share that encrypted token with a vendor (or more particularly with a vendor computer 101A which is operated by the vendor). In some embodiments, the application is a product of an is offered by the third-party which operates the third-party computer 101C.

Third-party computer 101C may belong to an organization such as a credit card provider, a customer loyalty program provider, a credit reporting company, or the like. Third-party computer 101C is capable of electronically communicating with and interacting with vendor computer 101A and with customer device 101B. Third-party computer 101C may be a single computer/server or a plurality of computers and one or more components may be distributed and/or cloud-based. In general, third-party computer 101C includes processing, memory, and storage, and may include one or more other elements described in conjunction with computer 101 of FIG. 7. Third-party computer 101C may be configured to interact with an application disposed on a customer device 101B in order to provide an encrypted token and/or assist with PII which is stored on the encrypted token. Third-party computer 101C may hold and disseminate keys that are used for the encryption and decryption of information in the encrypted token. In some embodiments third-party computer 101C may store other information such as credit scores, credit reports, purchase histories, and the like which is not stored on customer's encrypted token but may be provided to a vendor separately from an encrypted token (if authorized by the customer via the application).

Figure 2:
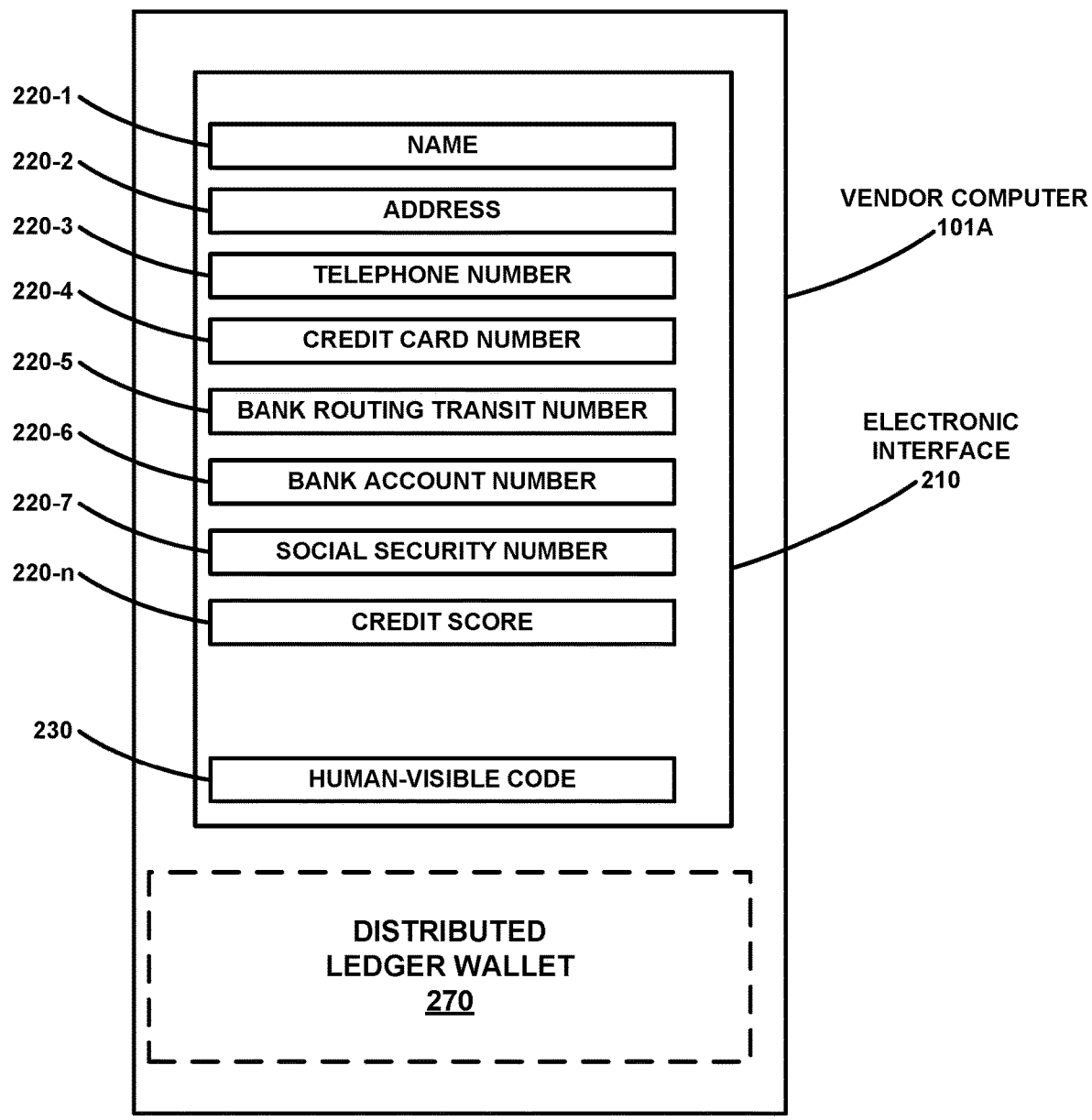
FIG. 2 illustrates a block diagram a vendor side electronic interface, in accordance with various embodiments.

FIG. 2 illustrates a block diagram a vendor side electronic interface 210, in accordance with various embodiments. The electronic interface 210 is presented by a vendor computer 101A, and may be in the form of a webpage pushed to and presented upon a display of a customer device 101B, or may be displayed on a display of a vendor computer 101A (e.g., on a display of a point of sale (POS) terminal).

The electronic interface 210 may provide a plurality of fields 220 (220-1 through 220-n) which constitute a request for a first set of customer information being requested to validate a customer so that an electronic transaction between the electronic interface 210 and a customer device 101B used by the customer may be completed. FIG. 2 shows one non-inclusive example of fields for a first set of personal information which may be requested to complete an electronic transaction to apply for a store branded charge card/credit card. It should be appreciated that variations are possible and anticipated which request more, less, and/or different personal information in the first set of personal information and which support other types of electronic transactions. With respect to FIG. 2, field 220-1 is for input of the customer's name; field 220-2 is for input of a customer's address; field 220-3 is for input of the customer's telephone number; field 220-4 is for input of the customer's credit card number; field 220-5 is for input of the customer's bank account routing transit number; field 220-6 is for input of the customer's bank account number; field 220-7 is for input of the customer's social security number; and field 220-n is for input of the customer's credit score.

Conventionally, at a point of sale terminal, the requested information would be hand-keyed (i.e., typed) into the fields either by a customer or by an associate of the vendor. Alternatively, if the fields are presented in an internet browser window, some conventional internet browsers may permit some amount of autofill of information which has previously been stored in a manner which may not be secure, which is not readily under the control of the customer, may not be transmitted in a secure fashion, and may not be stored in a secure fashion at the vendor computer 101A. As can be seen it will take some time to hand-key this information into the fields 220 and may even take some time to gather the information if the customer does not have it handy. Some information, such as the credit score may not even be in possession of the customer. Hand-keying such requested personal information may take several minutes, which slows a transaction. Additionally, hand-keying such requested personal information permits errors to be introduced such as misspelled words/names and/or mis-keyed numbers.

The electronic interface 210 also presents a human-visible code 230. Human-visible code 230 may be an alphanumeric code or another code which is machine-readable in addition to being visible to a human. Some examples of a machine-readable code include a linear barcode, a Quick Response code (i.e., a matrix barcode), a stacked barcode, or other barcode. The human-visible code 230 is presented so that it may be scanned or otherwise input into an application (e.g., application 310 of FIG. 3) on the customer device 101B. The human-visible code 230 provides instructions to the application on what PII is requested and/or required as part of the first set of personal information. The human-visible code 230 also provides instructions to the application for communicating an encrypted token with the customer's personal information to the electronic interface 210 to prevent the need to hand key information into the fields 220-1 through 220-n. Alternatively, in some embodiments, an electronic interface 210 may simply provide the human-visible code 230 and not present the fields 220. Following the instructions provided by the human-visible code, the application on the customer device 101B sends an encrypted token with a second set of personal information. The second set of information satisfies validates the customer in a satisfactory way to the vendor and may be the same or different than the first set of customer information. In some embodiments, the encrypted token is encrypted with cryptographic keys that are agreed upon in advance by the parties (or their devices/applications) that are exchanging information. Public-key/asymmetric cryptography is one example of which allow for secure exchange of encrypted data "in the open," using such agreed upon sets of encryption/decryption cryptographic keys. By "in the open," what is meant is the data is transmitted via a commercial network after being encrypted with a public key and, after being received, the data is decrypted using a private key which corresponds to the public key.

In some embodiments, an encrypted token from a customer device may be transmitted to vendor computer 101A as part of a distributed ledger (e.g., using blockchain technology or other distributed ledger technology) and deposited in distributed ledger wallet 270 which also holds keys for decrypting the encrypted tokens stored in the wallet. An application available on the customer's device, such as a distributed ledger application (e.g., distributed ledger wallet 370 on customer device 101B), can interpret distributed ledger user information. The distributed ledger wallet 370 (see FIG. 3) may be used by a customer to capture the "user address" of a vendor computer 101A and send encrypted data and/or documents to the vendor via vendor computer 101A and distributed ledger wallet 270. For example, human-visible code 230 may provide an address or other description for how to send an encrypted token from customer device 101B to distributed ledger wallet 270.

Figure 3:
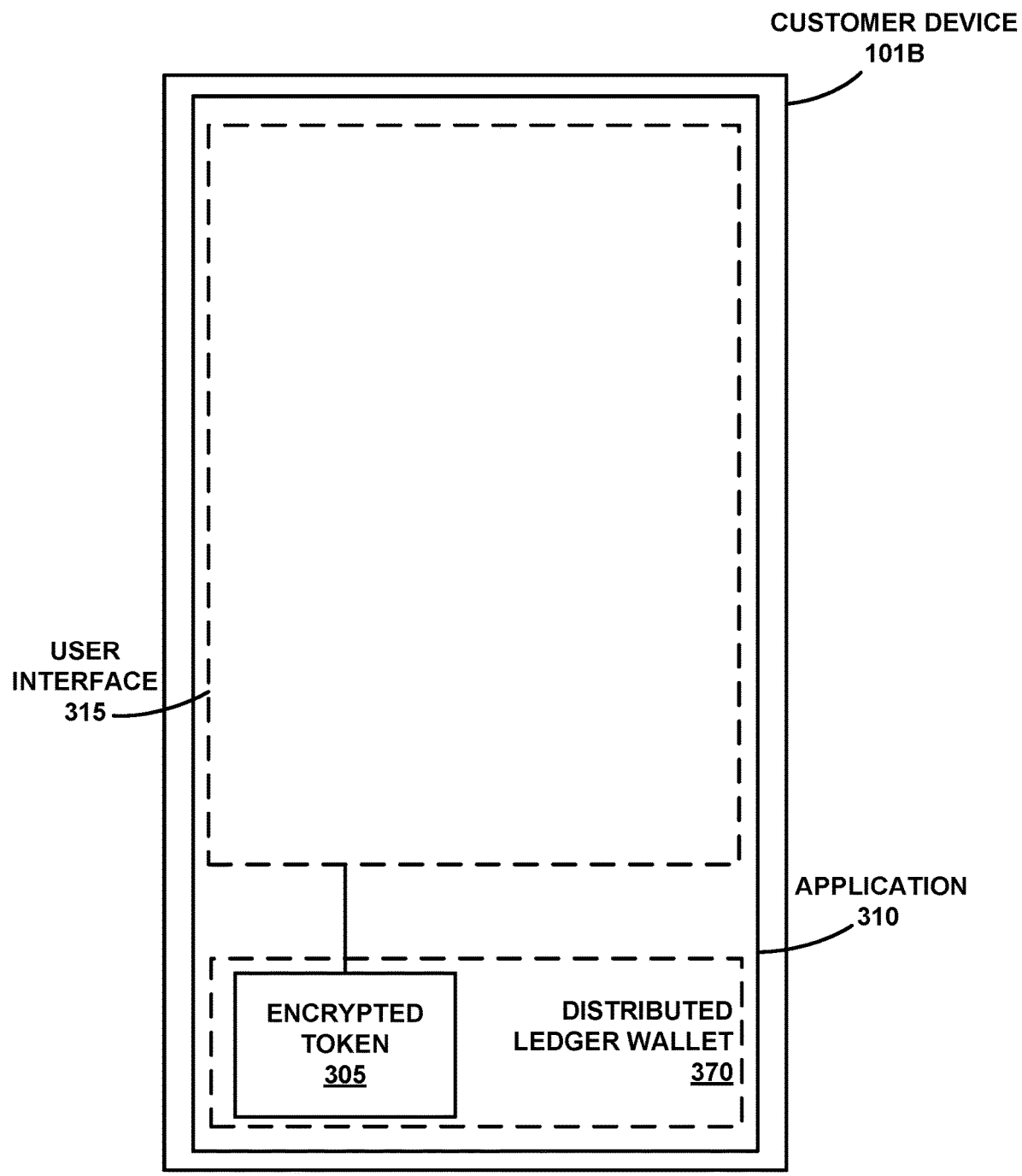
FIG. 3 is a block diagram of a customer device, in accordance with an embodiment.

FIG. 3 is a block diagram of a customer device 101B, in accordance with an embodiment. Customer device 101B includes an encrypted token 305 and may include one or more of a user interface 315 and a distributed ledger wallet 370.

Encrypted token 305 contains a second set of personal information which is PII associated with the customer who uses application 310. The second set of personal information may include contact information such as a mailing address, one or more phone numbers, and one or more email addresses. The second sent of personal information may include financial information such as: a social security number, a bank account routing transit number, a bank account number, a credit score, or the like. The second set of personal information may include medical information, insurance information, or other private information. This second set of personal information is encrypted, as is implied by the name "encrypted token" 305 and has been previously entered (prior to the transaction with vendor computer 101/electronic interface 210) agnostic of how or where it may be utilized in the future. Encrypted token 305 may be stored in application 310 or elsewhere on customer device 101B. In some embodiments, when blockchain technology is used to transmit encrypted token 305, it may be stored in a distributed ledger wallet 370 which is included as part of application 310 or located elsewhere on customer device 101B. The functionality of distributed ledger wallet 370 may be in a stand-alone application or may be built into a larger application. In either case, the application may be made available for the customer to download/install on their device (e.g., customer device 101B) for interaction with a vendor and/or third-party via similar distributed ledger wallets. When included, distributed ledger wallet 370 interacts with similar distributed ledger wallets such as distributed ledger wallet 270 belonging to the vendor and distributed ledger wallet 570 which belongs to the third-party. Encrypted token 305 may be transmitted by application 310 to a vendor computer 101A, electronic interface 210, or the like in response to a request for a first set of personal information. After being received by a vendor computer 101A, electronic interface 210, or the like, encrypted token 305 may be stored and decrypted by distributed ledger wallet 270, as required, to access the second set of personal information about the customer.

In some embodiments, application 310 may launch automatically in response to the customer/user of application 310 selecting a code on a vendor's electronic interface 210 (such as using a curser to select the human-visible code 230 on a web page) or capturing an image of the code (such as using an integrated camera of customer device to snap a photo of a bar code version of the human-visible code 230). In such an automated embodiment, application 310 may automatically send an encrypted token 305 with the requested or available personal information of the customer to a location specified by human-visible code 230. Such an embodiment may not include a user interface 315 or may include a more limited user interface.

In other embodiments, in response to customer/user of application 310 selecting a human-visible code on a vendor's electronic interface 210 application 310 may trigger the launch of user interface 315. A non-limiting example of such a user interface 315 is described in FIG. 4.

Figure 4:
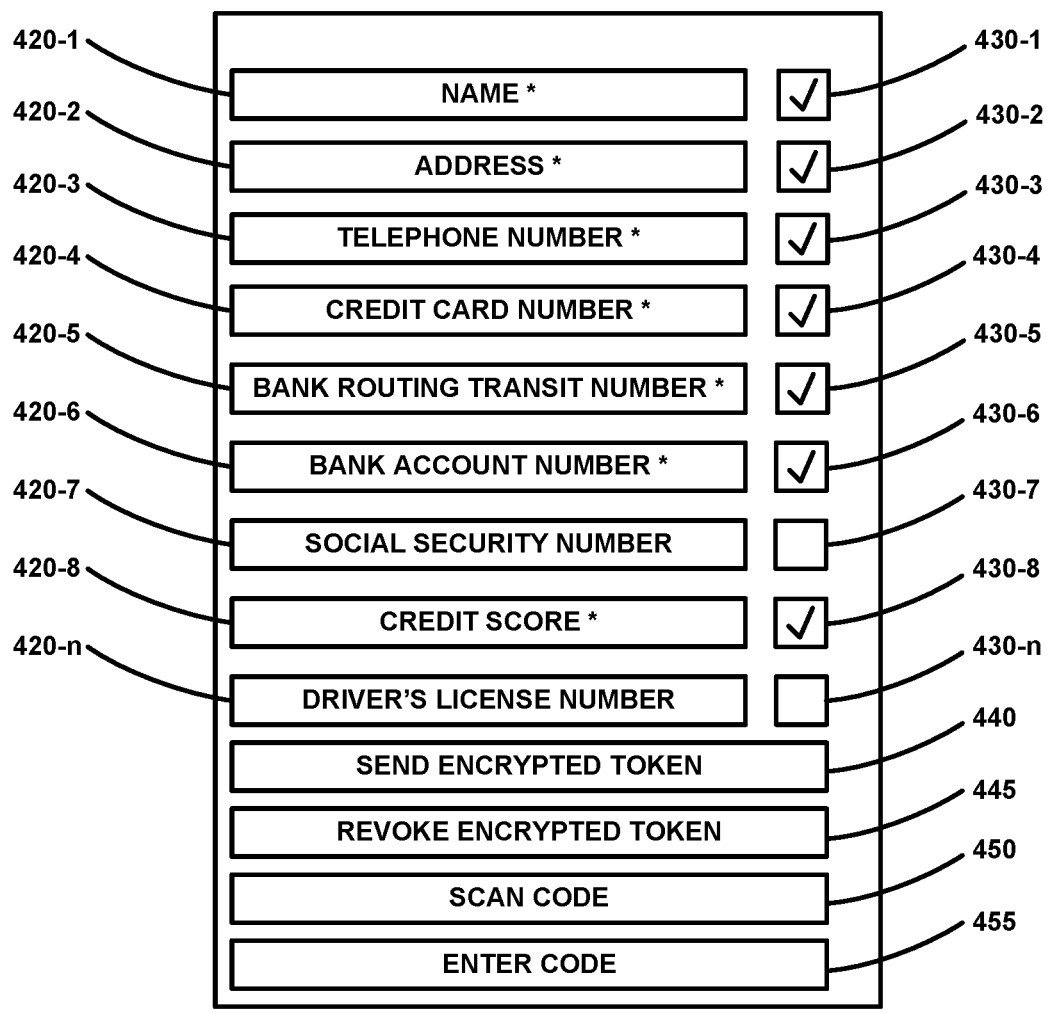
FIG. 4 depicts a user interface of an application operating on the customer device, in accordance with various embodiments.

FIG. 4 depicts a user interface 315 of an application 310 operating on the customer device 101B, in accordance with various embodiments. User interface 315, when included, may provide a customer with the ability to select which personal information of a plurality of personal information is either included within or decryptable from encrypted token 305. User interface 315 may additionally or alternatively present the customer/user of application 310 with controls and/or functionality with respect to transmission and revocation of personal information. User interface 315 may be opened by a customer/user of application 310 and/or may be launched automatically in some instances, as has been previously described.

As depicted in FIG. 4, a user interface 315 may give the customer selectable control of which personal information, from a trove of possible personal information, is included in encrypted token 305 or is made decryptable from encrypted token 305. It should be appreciated that a variety of personal information may be in the trove for the customer to selectively include in an encrypted token, this may allow the customer configure an encrypted token 305 with a second set of personal information which mirrors the personal information requested in the first set of personal information. With respect to FIG. 4 and user interface 315 the trove of personal data is represented by fields 420 (420-1 through 420-n) and may be selected or deselected for inclusion in encrypted token 305 using corresponding radio buttons 430 (430-1 through 430-n). In FIG. 4, field 420-1 is for input of the customer's name; field 420-2 is for input of a customer's address; field 420-3 is for input of the customer's telephone number; field 420-4 is for input of the customer's credit card number; field 420-5 is for input of the customer's bank account routing transit number; field 420-6 is for input of the customer's bank account number; field 420-7 is for input of the customer's social security number; and field 420-8 is for input of the customer's credit score; and field 420-n holds the customers driver's license number. In other embodiments, there may be more, less, and/or different fields 420 depending on what is present in the selectable trove of personal information.

In some embodiments, if an aspect of the first set of personal information is indicated in some fashion (such as the asterisks in some fields 420) as being "required" for completion of the transaction, a customer will need to elect to configure the encrypted token 305 with this required personal information to successfully complete the transaction. If there is no such indication, a customer can uncheck a corresponding radio button 430 to deselect the item of the trove so that it will not be included in the encrypted token 305. In some embodiments, a user interface 315 may only present the customer with a subset of information, from a larger trove, which has been requested in the first set of personal information by the electronic interface 210. As depicted, there are no asterisks next to the social security number 420-7 (because it is not required) or next to the driver's license number 420-n (because it was not requested). Accordingly, the customer has deselected radio boxes 430-7 and 430-n so that neither of these items of personal information is included in encrypted token 305. In some embodiments, application 310 may similarly flag information which might be considered "oversharing" or providing more information than is needed for the type of electronic transaction taking place. This might warn a customer that they should not share information with this vendor or should attempt to share less than was "required."

In some embodiments, user interface may include other user selectable functions. Some non-inclusive examples may include but are not limited to the functions associated with the following radio buttons: scan code 450, enter code 455, send encrypted token 440, and revoke encrypted token 455.

In response to selecting the "scan code" 450 radio button, a user enables a camera of the customer device 101B to scan and capture the human-visible code 230 which will provide instructions to application 310.

In response to selecting the "enter code" 450 radio button, a user is presented with a field in which the user may type in an alphanumeric human-visible code 230 which will provide instructions to application 310.

In response to selecting the "send encrypted token" 440 radio button, a user instructs application 310 to send an encrypted token 305 with the configured with the selected (e.g., checked boxes 430) personal information to the vendor computer 101A and/or electronic interface 210 in accordance with instructions in the human-visible code 230. Sending the encrypted token invokes building it, if it has not already been built. The building and encryption of the token can take place locally in application 310 or remotely at third-party computer 101C in accordance with the general fields of information which are selected in user interface 315.

In response to selecting the "revoke encrypted token" 450 radio button, a user will be presented with a list of previously sent encrypted tokens 305 and will be allowed to send a revocation request message to the vendor computer 101A and/or electronic interface 210 requesting that the previously sent encrypted token and any information decrypted from it be deleted from the vendor's systems. In some instances, a user may request that vendor delete all personal information of the customer and close any account maintained with the vendor. In other instances, the user may send a request to delete the maximum amount of information while leaving the user's account open with the vendor—this may include deletion of such items as a purchase history of a credit card or a viewing history of a streaming video service. Responsive to the revocation request message, the vendor computer 101A and/or electronic interface 210 will delete the personal information which has been requested to be deleted. For example, if the revocation request message indicates that the second set of personal information is to be deleted, then vendor computer 101A and/or electronic interface 210 will delete the second set of personal information and may also the encrypted token 305 from which the second set of personal information was decrypted. In some embodiments, a revocation request may be routed through the third-party computer 101C to the vendor computer 101A and/or electronic interface 210. As the third-party may be a large commercial company which controls participation in system 100, this may lend extra weight to the revocation request message, as a failure to comply could result in sanctions and/or a removal of a vendor from participation in system 100.

In other embodiments, other functionality may be presented, such as the functionality for the user to alter, add to, or delete personal information in the trove of information stored in the application 310. For example, a customer may have a name change after a marriage or divorce and need to change their surname. Similarly, a customer may move and need to change an address and driver's license number. Likewise, a customer may cancel a landline telephone and need to delete this information from the trove or open a new checking account and need to add this information to the trove.

Figure 5:
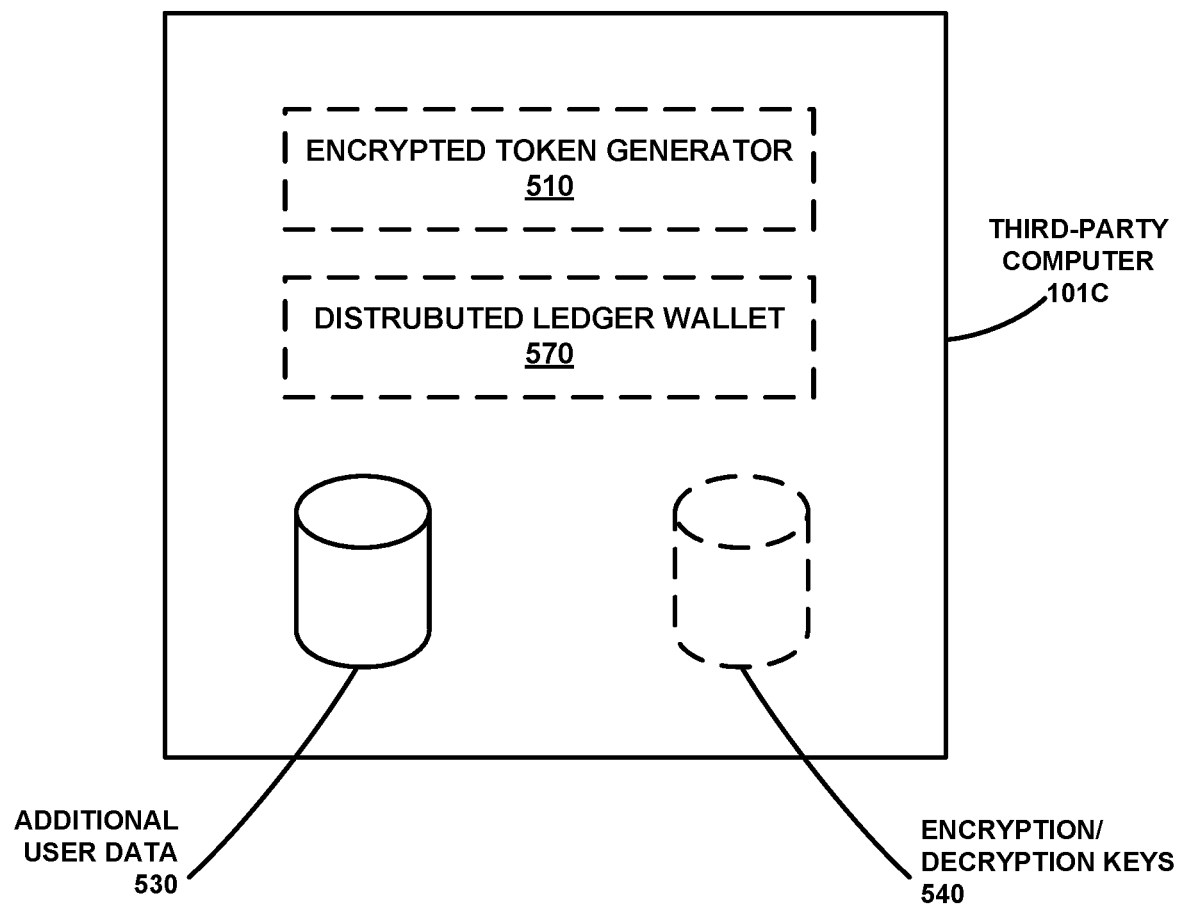
FIG. 5 is a block diagram of a third-party computer system, in accordance with various embodiments.

FIG. 5 is a block diagram of a third-party computer 101C, in accordance with various embodiments. Third-party computer 101C is operated, in some embodiments, by the same entity which is the purveyor of application 310. In some embodiments, third-party computer 101C may include one or more of an encrypted token generator 510, additionally user data 530, encryption/decryption keys 540, and a distributed ledger wallet 570.

An encrypted token generator 510 may be included in some embodiments. When included, a customer may utilize user interface 315 to select a second set of personal information from a trove to include in an encrypted token 305. The selected topics, but not the PII are sent from user interface 315 to encrypted token generator 510 where, based on the topics selected and PII associated with those topics which is maintained securely within third-party computer 101C, the encrypted token 305 may be generated by third-party computer 101C. Third-party computer 101C may then send the newly generated encrypted token 305 to application 310, or to the destination specified by the human-visible code 230.

Additional user data 530 may be maintained securely at third-party computer 101C. This additional user data may be selectable via user interface 315 to send to a vendor computer 101A and/or electronic interface 210 but not available in application 310 to include in encrypted token 305. As an example, a user may select to send a credit score and/or a full credit report to a vendor computer 101A and/or electronic interface 210. If this additional information is not maintained in application 310 but is maintained centrally at third-party computer 101C it can be encrypted and forwarded (per the customer's instructions) to the destination specified by the human-visible code 230 in order to supplement the second set of personal information in the encrypted token 305.

A set of encryption and/or decryption keys 540 may be maintained securely at third-party computer 101C. In some embodiments, these encryption and/or decryption keys 540 are maintained in secure storage and provided to application 310 as needed to create an encrypted token 305 (if they are created by application 310) and/or to a vendor computer 101A and/or electronic interface as required to decrypt a received encrypted token 305.

A distributed ledger wallet 570 may be included when distributed ledger technology is utilized. It holds keys used to encrypt/decrypt encrypted tokens which have been sent by a customer/user of application 310 and also holds pointers or other information to describe a location in a block chain or other shared transaction history where data of a particular exchanged of an encrypted token 305 is stored. In such an embodiment, distributed ledger wallet 570 shares transactions with other distributed ledger wallets (i.e., 270 and 370) described herein.

Example Methods of Operation

The following discussion sets forth in detail the operation of some example methods of operation. With reference to FIGS. 6A-6C, flow diagram 600 illustrates example procedures used by various embodiments. Flow diagram 600 includes some procedures that, in various embodiments, are carried out by one or more processors under the control of computer-readable and computer-executable instructions. In this fashion, procedures described herein and in conjunction with flow diagram 600 are, or may be, implemented in an automated fashion using a computer, such as computer system 101 of FIG. 7, in various embodiments. The computer-readable and computer-executable instructions can reside in any tangible, non-transitory computer-readable storage media, such as, for example, in data storage features such as peripheral computer-readable storage media 702, RAM 708, ROM 710, and/or data storage unit 712 (all illustrated in FIG. 7) or the like. The computer-readable and computer-executable instructions, which reside on tangible, non-transitory computer-readable storage media, are used to control or operate in conjunction with, for example, one or some combination of processor(s) 706 (see FIG. 7), or other similar processor(s) of a computer system such as, but not limited to computer system 101 of FIG. 7. Plainly put, the computer-readable and computer-executable instructions cause computer system 101 to perform a method such as the method described by the procedures of FIGS. 6A-6C. Although specific procedures are disclosed in flow diagram 600, such procedures are examples. That is, embodiments are well suited to performing various other procedures or variations of the procedures recited in flow diagram. Likewise, in some embodiments, the procedures in flow diagram 700 may be performed in an order different than presented and/or not all the procedures described may be performed. It is further appreciated that some or all the procedures described in flow diagram 600 may be implemented in hardware, or a combination of hardware with firmware and/or software.

Example Method of Validating a Customer in an Electronic Transaction

FIGS. 6A-6C depict a flow diagram 600 of a method of validating a customer in an electronic transaction, in accordance with various embodiments. Reference will be made to aspects of FIGS. 1-5 in the description of flow diagram 600.

Referring now to FIG. 6A, at procedure 610 of flow diagram 600, in various embodiments, an electronic interface of a vendor requests a first set of personal information to validate a customer. The first set of personal information is requested as a portion of a transaction between the electronic interface and a customer device used by the customer. With reference to FIGS. 1 and 2, this can comprise a transaction taking place between an electronic interface 210 of a vendor computer 101A and a customer device 101B operated by a customer. Consider an embodiment where the transaction is filling out an application for a branded (i.e., store) charge/credit card. The personal information requested by the fields 220 in FIG. 2 may be used to fill out the application for the credit card. Similar information may be used to process and fill out the application for an auto loan, or for access to some websites. In other embodiments, the transaction may involve requesting a first set of personal information to fill out an auto insurance application form or a form to perform an electronic government background check for a firearm purchase. As part of the request, the electronic interface presents a human-visible code 230 which is provided by the customer to the application (e.g., application 310) on the customer device 101B. The human-visible code 230 may be alphanumeric, some form of a barcode, an encoded image, or other code which can be clicked on/selected via the customer device 101B, hand-entered by the user into a field on the customer device 101B, scanned (such as with a camera) into the customer device 101B, or captured by other image capture technique by customer device 101B. The human-visible code 230, when decoded by the user application 310, provides details of the requested first set of personal information and instructions on where an encrypted token 305 (which includes personal information) should be sent to complete the transaction.

At procedure 620 of flow diagram 600, in various embodiments, responsive to authorization by the customer (i.e., the customer authorizing it to be sent), the electronic interface receives from the customer device an encrypted token (such as encrypted token 305) which includes a second set of personal information which identifies the customer and encompasses at least a portion of the first set of personal information. The customer authorization may be received via interaction with user interface 315 of application 310 or may be set up to automatically occur upon receipt of the human-visible code 230 by application 310. The second set of personal information may mirror the requested first set of personal information (i.e., include all of the requested first set of personal information), omit some items that were indicated as not required, omit some items deemed to be oversharing, omit some items that are not available or applicable, and/or include additional personal information. In some embodiments, the encrypted token may be created and encrypted on the customer device 101B, such as by application 310. In other embodiments, the encrypted token is provided to the customer device 101B from a third-party via an application on the customer device and is configured with the second set of personal information prior to the transaction. For example, third-party computer 101C may provide the encrypted token 305 to application 310 for use by application 310.

In some embodiments, the encrypted token 305 is received via participation of application 310 on customer device 101B and vendor computer 101A and/or electronic interface 210 in a distributed ledger system. The third-party, via third-party computer 101C, may also participate in this distributed ledger system. In such an embodiment, the encrypted token and associated keys to encrypt and decrypt it may be stored in a distributed ledger wallet 270 along with a pointer or other information to describe the location of the encrypted token 305 in the history of transactions in the distributed ledger.

At procedure 630 of flow diagram 600, in various embodiments, the electronic interface completes the transaction using the second set of personal information decrypted from the encrypted token to validate the customer. For example, after decrypting the second set of information from encrypted token 305, the second set of personal information is used to complete the electronic transaction. The instructions for decrypting the second set of personal information from the encrypted token 305 may be provided via the distributed ledger system and reside in the distributed ledger wallet 270 of the vendor computer 101A or may be received from the third-party computer 101C (e.g., sent from encryption/decryption keys storage 540).

In some embodiments, the transaction comprises a credit application (e.g., a charge card, credit card, a store credit application, or other credit application). In such embodiments completing the transaction comprises the electronic interface 210 using the second set of personal information decrypted from the encrypted token 305 to automatically fill the credit application with the second set of personal information. The credit application may then be automatically forwarded for review/approval.

In some embodiments, the transaction comprises a financial form (e.g., a form to open a bank account, a vehicle loan application form, a home loan application form, a home equity loan application form, a brokerage account application form, a mutual fund investment application form, or other financial form). In such embodiments completing the transaction comprises the electronic interface 210 using the second set of personal information decrypted from the encrypted token 305 to automatically fill the financial form/application with the second set of personal information. The financial form/application may then be automatically forwarded for review/approval.

In some embodiments, the transaction comprises a medical form (e.g., a form to open or apply for health insurance; a form to apply for a health insurance benefit; a new patient induction form at a hospital, dental office, medical clinic, optometry clinic; or the like). In such embodiments completing the transaction comprises the electronic interface 210 using the second set of personal information decrypted from the encrypted token 305 to automatically fill the medical form with the second set of personal information. The medical form may then be automatically forwarded for review/approval.

In other embodiments, the transaction may be the use of loyalty points from a credit card, store charge card, frequent flyer account, or the like. In yet other embodiments, the transaction may involve signing up for access to a website, completing a sales transaction on a website, validating a customer reward offer (i.e., a discount or free merchandise).

Referring now to FIG. 6B, at procedure 640 of flow diagram 600, in various embodiments, the method as recited in procedures 610-630 further comprises additional information from the third-party being received by the electronic interface to supplement the second set of personal information in the encrypted token, wherein the additional information includes one of: a credit score and a credit report. The additional information is received in response to authorization by the customer (i.e., the customer authorizing it to be sent). The customer authorization may be received via interaction with user interface 315 of application 310 or may be set up to automatically occur upon receipt of the human-visible code 230 by application 310. The additional information may include information such as a credit score, a credit report, purchase history at a store, a driving infractions record, a medical history, a medical record, or the like. Typically, the additional information is information that is not maintained on customer device 101B but which is maintained on the third-party computer 101C. For example, this additional information may be stored in an encrypted stat in additional user data 530 of third-party computer 101C.

Referring now to FIG. 6C, at procedure 650 of flow diagram 600, in various embodiments, the method as recited in procedures 610-630 further comprises the second set of personal information being deleted from storage by the vendor in response to receiving a revocation request from one of the application (i.e., application 310) and a computer of the third-party (i.e., third-party computer 101C). The request may be a revocation request message and may be sent in response to a customer interaction with the revocation functionality of user interface 315 of application 310. The revocation request message may request and result in the deletion of the encrypted token 305, deletion of the second set of personal information that has been decrypted from the encrypted token 305, and/or deletion of other information collected regarding the customer. In some instances, the revocation request message may request and result in complete deletion of the account of a customer and any information maintained about that customer which may legally be deleted.

Example Computer System

Figure 7:
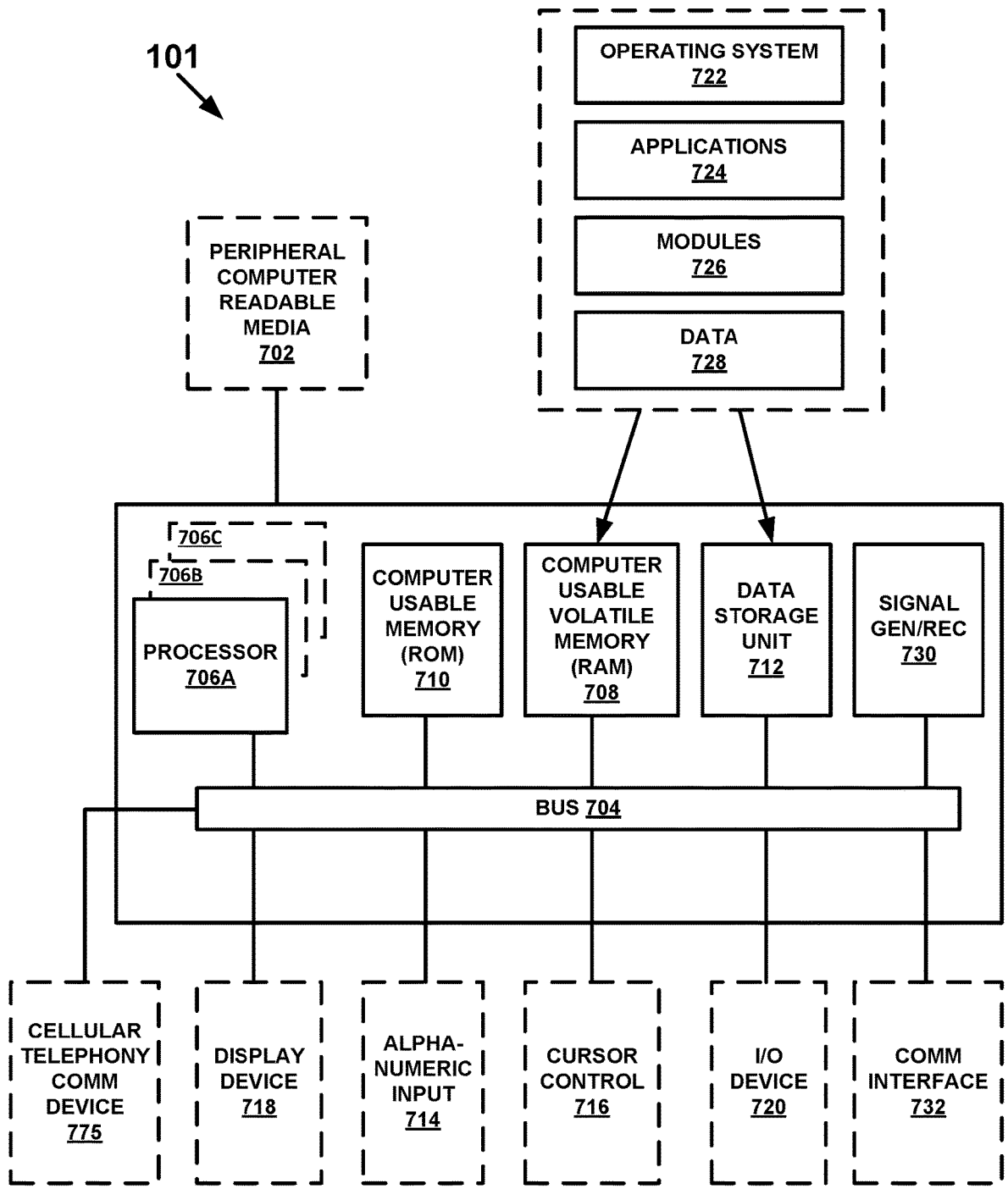
FIG. 7 is a block diagram of an example computer system with which or upon which various embodiments describe herein may be implemented.

With reference now to FIG. 7, all or portions of some embodiments described herein are composed of computer-readable and computer-executable instructions that reside, for example, in computer-usable/computer-readable storage media of a computer system. That is, FIG. 7 illustrates one example of a type of computer (computer system 101) that can be used in accordance with or to implement various embodiments which are discussed herein. It is appreciated that computer system 101 of FIG. 7 is only an example and that embodiments as described herein can operate on or within a number of different computer systems including, but not limited to, general purpose networked computer systems, embedded computer systems, server devices, client devices, various intermediate devices/nodes, stand-alone computer systems, media centers, handheld computer systems, multi-media devices, and the like. FIG. 7 represents a system or components that may be used in conjunction with aspects of the present technology. In one embodiment, some or all of the components described herein may be combined with some or all of the components of FIG. 7 to practice the present technology.

As shown in FIG. 7, computer system 101 is well adapted to optionally having peripheral computer readable storage media 702 such as, for example, a disk, a compact disc, a flash drive, and the like coupled thereto.

Computer system 101 of FIG. 7 includes an address/data/control bus 704 for communicating information, and a processor 706A coupled to bus 704 for processing information and instructions. As depicted in FIG. 7, computer system 101 is also well suited to a multi-processor environment in which a plurality of processors 706A, 706B, and 706C are present. Conversely, computer system 101 is also well suited to having a single processor such as, for example, processor 706A, and optionally one or more additional processors (e.g., 706B, 706C, and the like). Processors 706A, 706B, and 706C may be any of various types of microprocessors. Computer system 101 also includes data storage features such as a computer usable volatile memory 708, e.g., random access memory (RAM), coupled to bus 704 for storing information and instructions for processors 706A, 706B, and 706C. Computer system 101 also includes computer usable non-volatile memory 710, e.g., read only memory (ROM), coupled to bus 704 for storing static information and instructions for processors 706A, 706B, and 706C. Also present in system 101 is a data storage unit 712 (e.g., a magnetic disk drive, optical disk drive, solid state drive (SSD), and the like) coupled to bus 704 for storing information and instructions. Signal generating and receiving device(s) 730 of the present embodiment may include wired serial adaptors, modems, and network adaptors, wireless modems, and wireless network adaptors, and other such communication technology.

Computer system 101 also optionally includes an alphanumeric input device 714 including alphanumeric and function keys coupled to bus 704 for communicating information and command selections to processor 706A or processors 706A, 706B, and 706C. Computer system 101 also optionally includes a cursor control device 716 coupled to bus 704 for communicating user input information and command selections to processor 706A or processors 706A, 706B, and 706C. Optional cursor control device may be a touch sensor, gesture recognition device, and the like. Computer system 101 of the present embodiment also optionally includes a display device 718 coupled to bus 704 for displaying information.

Referring still to FIG. 7, optional display device 718 of FIG. 7 may be a liquid crystal device, cathode ray tube, OLED, plasma display device or other display device suitable for creating graphic images and alpha-numeric characters recognizable to a user. Optional cursor control device 716 allows the computer user to dynamically signal the movement of a visible symbol (cursor) on a display screen of display device 718. Many implementations of cursor control device 716 are known in the art including a trackball, mouse, touch pad, joystick, non-contact input, gesture recognition, voice commands, bio recognition, and the like. In addition, special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands. System 101 also includes one or more signal generating and receiving device(s) 730 coupled with bus 704 for enabling system 101 to interface with other electronic devices and computer systems.

System 101 is also well suited to having a cursor directed by other means such as, for example, voice commands. Computer system 101 also optionally includes an I/O device 720 for coupling system 101 with external entities. For example, in one embodiment, I/O device 720 is a modem for enabling wired or wireless communications between system 101 and an external network such as, but not limited to, the Internet or intranet. A more detailed discussion of the present technology is found below.

Referring still to FIG. 7, various other components are depicted for system 101. Specifically, when present, an operating system 722, applications 724, modules 726, and data 728 are shown as typically residing in one or some combination of computer usable volatile memory 708, e.g., random access memory (RAM), and data storage unit 712. However, it is appreciated that in some embodiments, operating system 722 may be stored in other locations such as on a network or on a flash drive; and that further, operating system 722 may be accessed from a remote location via, for example, a coupling to the internet. In one embodiment, the present technology, for example, is stored as an application 724 or module 726 in memory locations within RAM 708 and memory areas within data storage unit 712. The present technology may be applied to one or more elements of described system 101.

The signal generating and receiving device(s) 730 may work in conjunction with one or more optionally included communication interface(s) 732 for coupling information to and/or from system 101. Communication interface 732 may include a serial port, parallel port, Universal Serial Bus (USB), Ethernet port, Bluetooth, thunderbolt, near field communications port, WiFi, Cellular modem, or other input/output interface. Communication interface 732 may physically, electrically, optically, or wirelessly (e.g., via radio frequency) couple computer system 101 with another device, such as a mobile phone, radio, or computer system.

Cellular telephony communication device 775, when included, interacts wirelessly with a cellular telephone network to send and receive messages via one or more cellular messaging services such as SMS (short message service) and/or MMS (multimedia message service).

The computing system 101 is only one example of a suitable computing environment and is not intended to suggest any limitation as to the scope of use or functionality of the present technology. Neither should the computing environment be interpreted as having any dependency or requirement relating to any one or combination of components illustrated in the example computing system 101.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method of validating a customer in an electronic transaction, the method comprising:
   receiving, at a distributed ledger application operating on a customer device and from a third-party, an encrypted token as part of a distributed ledger;
   receiving, at said distributed ledger application operating on said customer device and from said third-party, information to describe a location in a block chain of said encrypted token in a history of transactions in said distributed ledger;
   requesting, by an electronic interface of a vendor, a first set of personal information to validate a customer, wherein the first set of personal information is requested as a portion of a transaction between the electronic interface and said customer device used by the customer;
   responsive to authorization by the customer, receiving at the electronic interface from the customer device said encrypted token comprising: a second set of personal information which identifies the customer and encompasses at least a portion of the first set of personal information, wherein the encrypted token is configured with the second set of personal information prior to the transaction, said receiving said encrypted token via participation in a distributed ledger system with a computer of said third-party and said distributed ledger application on said customer device; and
   completing, by the electronic interface, the transaction using the second set of personal information decrypted from the encrypted token to validate the customer.

2. The method as recited in claim 1, further comprising:
   responsive to authorization from the customer, receiving additional information from the third-party by the electronic interface to supplement the second set of personal information in the encrypted token, wherein the additional information includes one of: a credit score and a credit report.

3. The method as recited in claim 1, further comprising:
   deleting the second set of personal information from storage by the vendor in response to receiving a revocation request from one of the distributed ledger application and a computer of the third-party.

4. The method as recited in claim 1, wherein the requesting, by an electronic interface, a first set of personal information to validate a customer comprises:
   presenting, by the electronic interface, a human-visible code which is provided by the customer to the distributed ledger application on the customer device.

5. The method as recited in claim 1, wherein the completing, by the electronic interface, the transaction using the second set of personal information decrypted from the encrypted token to validate the customer comprises:
   decrypting the second set of personal information from the encrypted token based on instructions received from the third-party.

6. The method as recited in claim 1, wherein the transaction comprises a credit application and the completing, by the electronic interface, the transaction using the second set of personal information decrypted from the encrypted token to validate the customer comprises:
   automatically filling the credit application with the second set of personal information.

7. The method as recited in claim 1, wherein the transaction comprises a financial form and the completing, by the electronic interface, the transaction using the second set of personal information decrypted from the encrypted token to validate the customer comprises:

automatically filling the financial form with the second set of personal information, wherein the second set of personal information includes personally identifiable information of the customer.

8. The method as recited in claim 1, wherein the transaction comprises a medical form and the completing, by the electronic interface, the transaction using the second set of personal information decrypted from the encrypted token to validate the customer comprises:

automatically filling the medical form with the second set of personal information, wherein the second set of personal information includes protected health information of the customer.

9. A non-transitory computer readable storage medium comprising instructions, which when executed cause a computer system to perform method of validating a customer in an electronic transaction, the method comprising:

receiving, at a distributed ledger application operating on a customer device and from a third-party, an encrypted token as part of a distributed ledger;

receiving, at said distributed ledger application operating on said customer device and from said third-party, information to describe a location in a block chain of said encrypted token in a history of transactions in said distributed ledger;

requesting, by an electronic interface, a first set of personal information to validate a customer, wherein the first set of personal information is requested as a portion of a transaction between the electronic interface and said customer device used by the customer;

responsive to authorization by the customer, receiving, at the electronic interface from the customer device, said encrypted token comprising: a second set of personal information which identifies the customer and encompasses at least a portion of the first set of personal information, wherein the encrypted token is configured with the second set of personal information prior to the transaction, said receiving said encrypted token via participation in a distributed ledger system with a computer of said third-party and said distributed ledger application on said customer device; and completing, by the electronic interface, the transaction using the second set of personal information decrypted from the encrypted token to validate the customer.

10. The non-transitory computer readable storage medium of claim 9, further comprising:

responsive to authorization from the customer, receiving additional information from the third-party by the electronic interface to supplement the second set of personal information in the encrypted token, wherein the additional information includes one of: a credit score and a credit report.

11. The non-transitory computer readable storage medium of claim 9, wherein the requesting, by an electronic interface, a first set of personal information to validate a customer comprises:

presenting, by the electronic interface, a human-visible code which is provided by the customer to the distributed ledger application on the customer device.

12. The non-transitory computer readable storage medium of claim 9, wherein the completing, by the electronic interface, the transaction using the second set of personal information decrypted from the encrypted token to validate the customer comprises:

decrypting the second set of personal information from the encrypted token based on instructions received from the third-party.

13. A system for validating a customer in an electronic transaction, the system comprising:

an electronic interface, operated by a vendor to carry out an electronic transaction with a customer, wherein the electronic transaction involves a request for a first set of personal information from the customer;

a distributed ledger application on a customer device, used by the customer, the distributed ledger application configured to receive and securely store:

an encrypted token as part of a distributed ledger from a third-party, wherein the encrypted token includes a second set of personal information of the customer supplied prior to the electronic transaction; and information to describe a location in a block chain of said encrypted token in a history of transactions in said distributed ledger; and a third-party computer operated by the third-party, wherein the third-party is neither the vendor nor the customer, and wherein the third-party computer is configured to generate the encrypted token;

wherein the electronic interface is configured to:

request a first set of personal information to validate a customer, wherein the first set of personal information is requested as a portion of a transaction between the electronic interface and said customer device used by the customer;

responsive to authorization by the customer, receive from the customer device said encrypted token which includes said second set of personal information which identifies the customer and encompasses at least a portion of the first set of personal information, wherein the encrypted token is provided to the customer device from said distributed ledger application on the customer device and is configured with the second set of personal information prior to the transaction, wherein said encrypted token is received by said electronic interface via participation in a distributed ledger system with said third-party computer and said distributed ledger application on the customer device; and complete the transaction using the second set of personal information decrypted from the encrypted token to validate the customer.

14. The system of claim 13, wherein the electronic interface is further configured to:

delete the second set of personal information in response to receiving a revocation request from one of the distributed ledger application and the third-party computer.

15. The system of claim 13, wherein responsive to authorization from the customer, the third-party computer is configured to:

send additional information to the electronic interface to supplement the second set of personal information in the encrypted token, wherein the additional information includes one of: a credit score and a credit report.

16. The system of claim 13, wherein the request for a first set of personal information to validate a customer comprises:

the electronic interface presenting a human-visible code which is provided by the customer to the distributed ledger application on the customer device.

17. The system of claim 13, wherein the second set of personal information is decrypted from the encrypted token based on instructions received from the third-party computer.

18. The system of claim 13, wherein the transaction comprises a form and the electronic interface automatically fills the form using the second set of personal information decrypted from the encrypted token.

19. The system of claim 13, wherein the electronic interface comprises one of a point of sale terminal and a web page.

20. The system of claim 13, wherein the customer device comprises one of a cellular telephone, a smart watch, a tablet computer, and a personal computer.

* * * * *